United States Patent
Hurd et al.

(10) Patent No.: US 11,435,441 B2
(45) Date of Patent: Sep. 6, 2022

(54) SELF-LEARNING, NOISE FILTERING OF RADAR USED FOR AUTOMOTIVE APPLICATIONS

(71) Applicant: GM GLOBAL TECHNOLOGY OPERATIONS LLC, Detroit, MI (US)

(72) Inventors: Carter J. Hurd, Southfield, MI (US); Jeffrey A. Clark, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 852 days.

(21) Appl. No.: 16/296,878

(22) Filed: Mar. 8, 2019

(65) Prior Publication Data
US 2020/0284876 A1 Sep. 10, 2020

(51) Int. Cl.
*E05F 15/40* (2015.01)
*G01S 7/41* (2006.01)

(52) U.S. Cl.
CPC .............. *G01S 7/414* (2013.01); *E05F 15/40* (2015.01); *G01S 7/415* (2013.01); *E05Y 2400/20* (2013.01); *E05Y 2400/32* (2013.01); *E05Y 2400/44* (2013.01); *E05Y 2400/45* (2013.01); *E05Y 2900/531* (2013.01)

(58) Field of Classification Search
CPC .......... G01S 7/414; G01S 7/415; E05F 15/40; E05Y 2400/20; E05Y 2400/32; E05Y 2400/44; E05Y 2400/45; E05Y 2900/531
See application file for complete search history.

(56) References Cited

FOREIGN PATENT DOCUMENTS

CN 208569027 U 3/2019

OTHER PUBLICATIONS

Chinese Office Action for Chinese Application No. 202010146090.0; dated Jan. 6, 2021; 6 pages.

*Primary Examiner* — Mathew Franklin Gordon
(74) *Attorney, Agent, or Firm* — Cantor Colburn LLP

(57) ABSTRACT

Embodiments include methods, systems and computer readable storage medium for a method for operating one or more doors of a vehicle is disclosed. The method includes receiving, by at least one radar sensor on the vehicle, input data related to one or more objects. The method further includes filtering, by the at least one radar sensor, vehicle environment noise from the received input. The method further includes identifying, by the at least one radar sensor, an external environment for the vehicle based on the filtered input. The method further includes operating, by a processor, one or more doors of the vehicle based on the external environment for the vehicle.

20 Claims, 7 Drawing Sheets

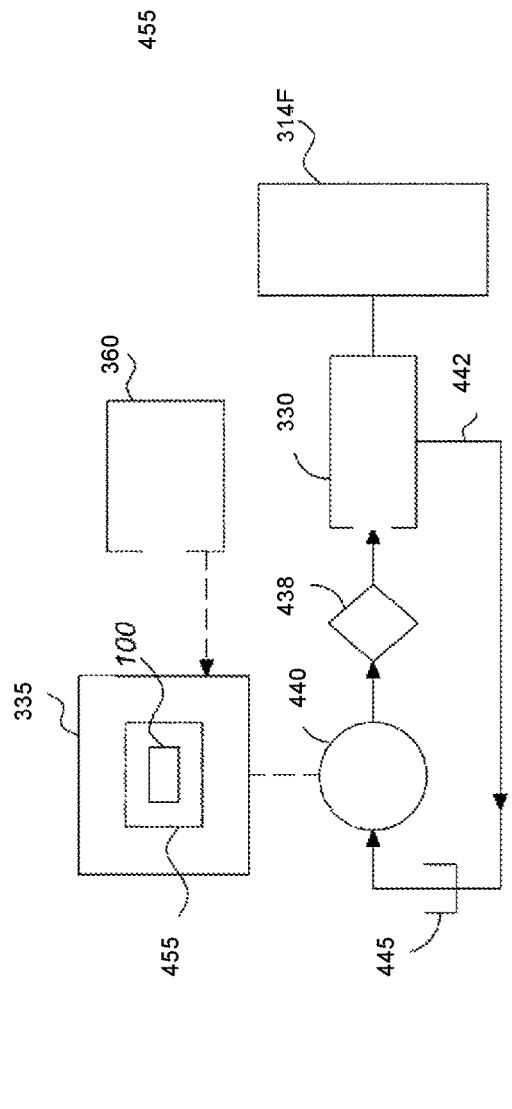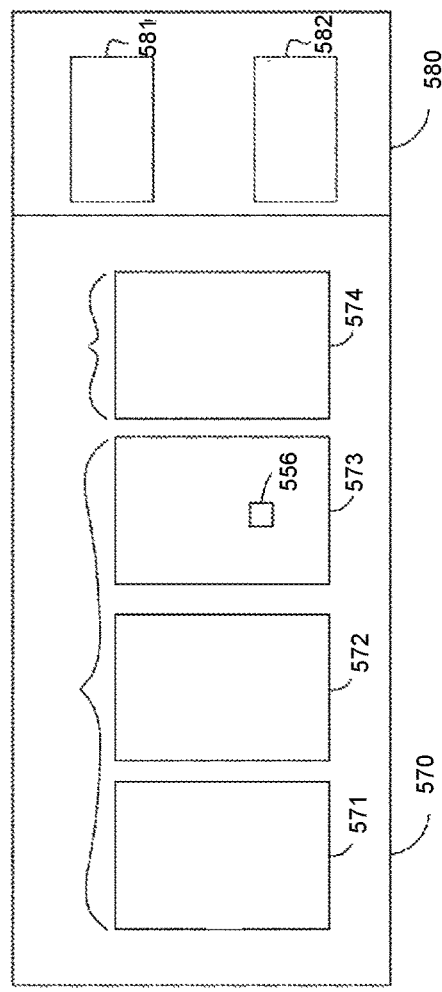

SELF-LEARNING, NOISE FILTERING OF RADAR USED FOR AUTOMOTIVE APPLICATIONS

INTRODUCTION

The subject disclosure relates to door operation for a vehicle, and more specifically to automatic power door opening procedures based on objects detected by radar.

Automotive vehicles are typically entered by lifting or pulling an exterior door handle and actuating a lever mechanism positioned within a vehicle door assembly, thereby unlatching the door so that it may freely pivot about a hinge. Modern vehicles may be provided with a remote access device, such as a push-button key fob, that a vehicle occupant may activate a short distance from the vehicle in order to automatically lock or unlock the door. Certain vehicles such as minivans may also include one or more power sliding side doors that slide or roll along a set of tracks or guide slots, and/or a swinging rear hatch door, deck lid, or trunk lid, each of which may be similarly activated from outside the vehicle using a button on a push-button fob. With such remote devices, the vehicle door conveniently opens and closes, and locks or unlocks, at the touch of a button, thus greatly simplifying ingress to and egress from the vehicle, as well as facilitating the loading and unloading of cargo.

Swinging side vehicle doors in particular typically house various integrated connections and other control features, such as power window system components, power folding mirrors, and/or electronic door lock mechanisms, each of which may add mass to the door panel assembly and require additional space for clearance with opening a vehicle door. In addition, a standard vehicle door assembly additionally includes a frame with an inner front-frame member for forming a front edge of the door assembly; an inner rear-frame member for forming a rear edge of the door assembly; a waist reinforcing member for connecting the front frame member with the rear frame member; and a hinge member for connecting the door assembly to the vehicle. The door assembly also includes a shell or housing and a window opening where a window frame is connected to the door housing. The door housing itself can be limited to two primary components: an outer panel and an inner panel or lining. Depending on the size, weight, geometry, and trajectory range for opening the door assembly, the door shell is susceptible to significant damage caused by inadvertent contact with undetected obstructions or objects foreign to the vehicle while the door assembly is moving. Large sport utility vehicles ("SUVs") and other large vehicles tend to have large doors with large door openings angles, which greatly exacerbate the potential of doing damage to the door shell while moving the door assembly from the fully closed to the fully open position. Conventional methods of operating a vehicle door may be less than optimal.

SUMMARY

In one exemplary embodiment, a method for operating one or more doors of a vehicle is disclosed. The method includes receiving, by at least one radar sensor on the vehicle, input data related to one or more objects. The method further includes filtering, by the at least one radar sensor, vehicle environment noise from the received input. The method further includes identifying, by the at least one radar sensor, an external environment for the vehicle based on the filtered input. The method further includes operating, by a processor, one or more doors of the vehicle based on the external environment for the vehicle.

In addition to one or more of the features described herein, one or more aspects of the described method recognize that the vehicle environment noise is determined while the vehicle is traveling at a speed above a predetermined threshold. Another aspect of the method is that the vehicle environment noise is determined based on an identification of an object of the one or more objects having a zero Doppler. Another aspect of the method further includes calculating a variable opening angle for the one or more doors based on the external environment for the vehicle. Another aspect of the method is that the determination of the vehicle environment noise occurs periodically. Another aspect of the method is that an object of the one or more objects associated with the vehicle environment noise is designated as a false object. Another aspect of the method further includes opening the one or more doors of the vehicle to a maximum available opening angle in response to identifying an object of the one or more objects within the external environment.

In another exemplary embodiment, a system for operating one or more doors of a vehicle is disclosed herein. The system includes a vehicle having one or more doors, a memory, a processor coupled to the memory and one or more radar sensors. The one or more radar sensors are operable to receive input data related to one or more objects. The one or more radar sensors are further operable to filter vehicle environment noise from the received input. The one or more radar sensors are further operable to identify an external environment for the vehicle based on the filtered input. The processor associated with the vehicle is operable to operate the one or more doors based on the external environment for the vehicle.

In yet another exemplary embodiment a computer readable storage medium for performing a method for operating one or more doors of a vehicle is disclosed herein. The computer readable storage medium includes receiving input data related to one or more objects. The computer readable storage medium further includes filtering vehicle environment noise from the received input. The computer readable storage medium further includes identifying an external environment for the vehicle based on the filtered input. The computer readable storage medium further includes operating one or more doors of the vehicle based on the external environment for the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4 is a schematic diagram of a hydraulic pump circuit usable in the vehicle shown in FIG. 3 according to one or more embodiments;

FIG. 5 is a schematic illustration of obstacle detection sensors usable with the vehicle shown in FIG. 3 according to one or more embodiments;

DETAILED DESCRIPTION

Figure 1:
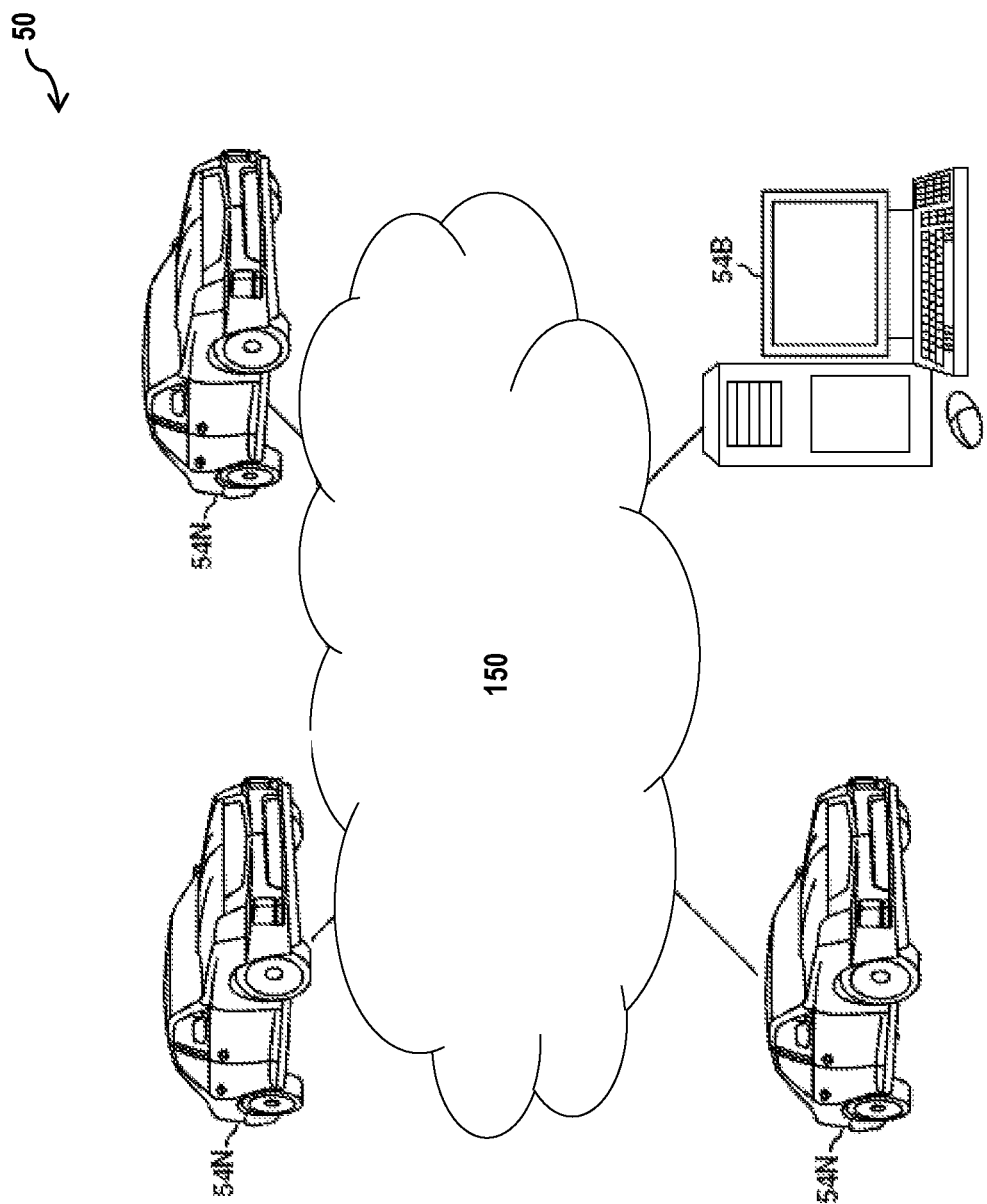
FIG. 1 is a computing environment according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 illustrates a computing environment 50 associated with a system for collision avoidance by a vehicle according to one or more embodiments. As shown, the computing environment 50 comprises one or more computing devices, for example, a server/cloud 54B, and/or a vehicle onboard computer system 54N incorporated into each of a plurality of autonomous or non-autonomous vehicles, which are connected via network 150. The one or more computing devices can communicate with one another using network 150.

Network 150 can be, for example, a cellular network, a local area network (LAN), a wide area network (WAN), such as the Internet and WIFI, a dedicated short-range communications network (for example, V2V communication (vehicle-to-vehicle), V2X communication (i.e., vehicle-to-everything), V2I communication (vehicle-to-infrastructure), and V2P communication (vehicle-to-pedestrian)), or any combination thereof, and may include wired, wireless, fiber optic, or any other connection. Network 150 can be any combination of connections and protocols that will support communication between server/cloud 54B, and/or the plurality of vehicle onboard computer systems 54N, respectively.

When a cloud is employed instead of a server, server/cloud 54B can serve as a remote computing resource. Server/cloud 54B can be implemented as a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 2:
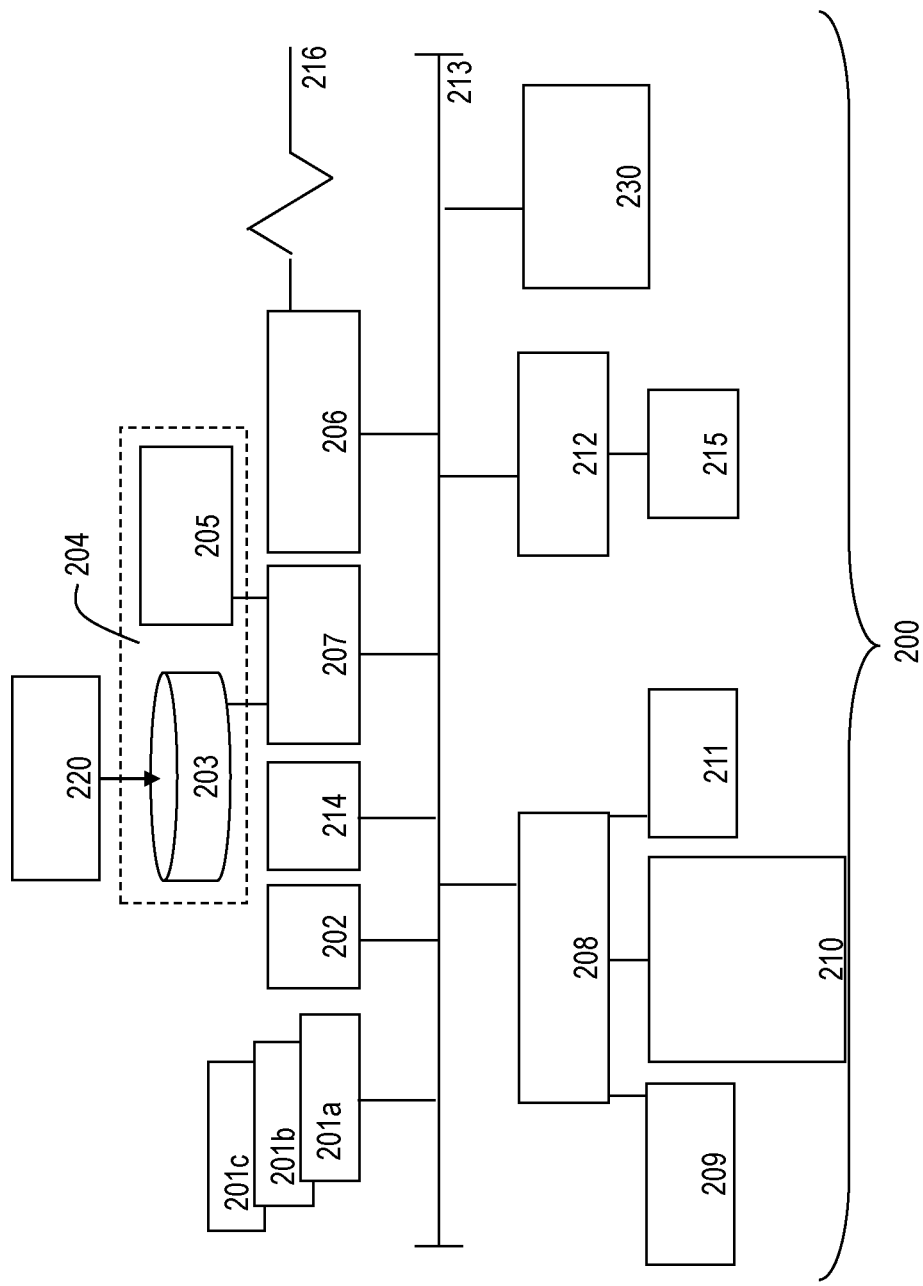
FIG. 2 is a block diagram illustrating one example of a processing system for practice of the teachings herein.

In accordance with an exemplary embodiment, FIG. 2 illustrates a processing system 200 for implementing the teachings herein. The processing system 200 can form at least a portion of the one or more computing devices, such as server/cloud 54B, and/or vehicle onboard computer system 54N. The processing system 200 may include one or more central processing units (processors) 201a, 201b, 201c, etc. (collectively or generically referred to as processor(s) 201). Processors 201 are coupled to system memory 214 and various other components via a system bus 213. Read only memory (ROM) 202 is coupled to the system bus 213 and may include a basic input/output system (BIOS), which controls certain basic functions of the processing system 200.

FIG. 2 further depicts an input/output (I/O) adapter 207 and a network adapter 206 coupled to the system bus 213. I/O adapter 207 may be a small computer system interface (SCSI) adapter that communicates with a hard disk 203 and/or another storage drive 205 or any other similar component. I/O adapter 207, hard disk 203, and another storage drive 205 are collectively referred to herein as mass storage 204. Operating system 220 for execution on the processing system 200 may be stored in mass storage 204. The network adapter 206 interconnects system bus 213 with an outside network 216, which can be network 150, enabling processing system 200 to communicate with other such systems. A screen (e.g., a display monitor) 215 can be connected to system bus 213 by display adaptor 212, which may include a graphics adapter to improve the performance of graphics intensive applications and a video controller. In one embodiment, network adapter 206, I/O adapter 207, and display adapter 212 may be connected to one or more I/O busses that are connected to system bus 213 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 213 via user interface adapter 208 and display adapter 212. A microphone 209, steering wheel/dashboard controls 210, and speaker 211 can all be interconnected to system bus 213 via user interface adapter 208, which may include, for example, a Super I/O chip integrating multiple device adapters into a single integrated circuit.

The processing system 200 may additionally include a graphics-processing unit 230. The graphics-processing unit 230 is a specialized electronic circuit designed to manipulate and alter memory to accelerate the creation of images in a frame buffer intended for output to a display. In general, graphics-processing unit 230 is very efficient at manipulating computer graphics and image processing and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including system memory 214 and mass storage 204, input means such as microphone 209 and steering wheel/dashboard controls 210, and output capability including speaker 211 and display monitor 215. In one embodiment, a portion of system memory 214 and mass storage 204 collectively store an operating system to coordinate the functions of the various components shown in FIG. 2.

Figure 3:
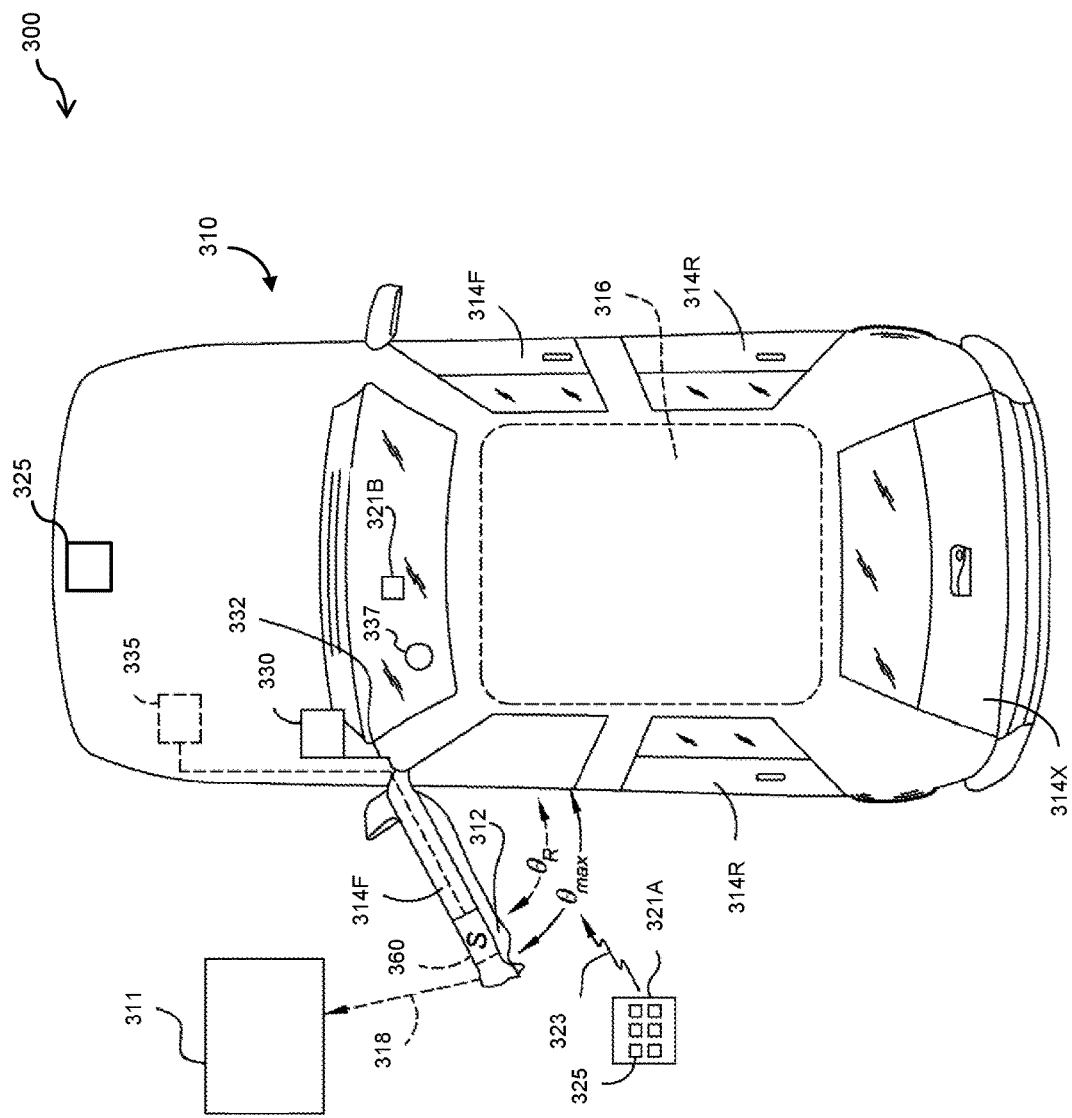
FIG. 3 depicts a schematic view of an exemplary vehicle system according to one or more embodiments.

FIG. 3 depicts components of a system 300 associated with vehicles incorporating the vehicle onboard computer system 54N according to one or more embodiments. A vehicle 310 generally includes a radar system 325.

Radar system 325 can include a short-range radar subsystem and/or a long-range radar subsystem. Object-locating sensing sensors associated with radar system 325 may include any range sensors, such as FM-CW radars, (Frequency Modulated Continuous Wave), pulse and FSK (Frequency Shift Keying) radars, and Lidar (Light Detection and Ranging) devices, and ultrasonic devices that rely upon effects such as Doppler-effect measurements to locate forward objects.

The object-locating sensing sensors can be placed in relatively unobstructed positions around the vehicle 310. Each of the object-locating sensing sensors can include a transmitter (not shown) capable of emitting radio waves or other EM radiation, a receiver device (not shown) capable of sensing the emitted waves reflected back to the receiver from objects in front of the transmitter, and means to transfer the sensed waves into a data format capable of analysis, indicating for example range, relative speed and angle from the objects off which the waves reflected. Each of the object-locating sensing sensors provides an estimate of an actual location, relative speed or condition of a targeted object, which includes an estimated position and standard deviation. Accordingly, the radar system 325 can estimate a range, a range rate and an azimuth location of an object.

Each object-locating sensor can provide an output including range, R, time-based change in range, R_dot, and angle, $\Theta$, preferably with respect to a longitudinal axis of the vehicle, which can be written as a measurement vector (o), i.e., sensor data. An exemplary short-range radar subsystem has a field-of-view (FOV) of 160 degrees and a maximum range of thirty meters.

Vehicle 310 also includes a pair of front side doors 314F and a substantially similar pair of rear side doors 314R, with side doors 314F, 314R preferably configured as side-hinged or side-swinging doors for access to and egress from a passenger compartment 316. Vehicle 310 also includes a truck/rear opening (e.g., tailgate or rear life gate) door 314X. Vehicle 310 has a programmable electronic control module or controller 335 in communication with and adapted or configured for controlling one or more actuating devices or actuators 330, with an actuator 330 being operatively connected to side door 314F as represented by connection 332, and adapted to automatically move or operate at least one of side doors 314F, 314R in response to various user or occupant-selected commands, as described in detail herein below.

A remote access device 321A, such as a key fob or other passive entry device capable of emitting a door command signal 323 for opening or closing at least one side door 314F, 314R, and is configured with a plurality of buttons 325 each corresponding to a separate door-operating mode. Likewise, a substantially similar control panel 321B may be positioned at one or more convenient locations or positions within passenger compartment 316 of vehicle 310 to thereby provide for ease of use or convenience of activation, with control panel 321B also adapted for automatically opening and/or closing at least one of side doors 314F, 314R from within vehicle 310.

Front side door 314F is shown as a front side door of a typical 4-door sedan-style passenger vehicle, and is preferably a conventional side-hinged or "side-swinging" vehicle entry door providing access to and egress from passenger compartment 316. Other vehicles, for example, a truck, a sport utility vehicle (SUV), a recreational vehicle (RV), a minivan, etc., may include one or more additional doors. While front side door 314F, rear side door 314R, trunk 314X and/or any other additional doors of vehicle 310 may be configured for use in conjunction with the invention, for simplicity front side door 314F will be referred to exclusively hereinafter.

Front side door 314F is configured to open to a maximum opening angle, i.e., $\theta_{max}$ with the quantity $\theta_{max}$ being the maximum available opening angle of front side door 314F within the particular design parameters or limitations of front side door 314F. Additionally, front side door 314F can open to a variable opening angle, abbreviated as $\theta_R$ and shown in phantom in FIG. 3, that is programmable and recordable into memory 455 (see FIG. 4). The variable opening angle $\theta_R$ has a value ranging from approximately 0 degrees (i.e. fully closed) up to and including the maximum available opening angle $\theta_{max}$. The variable opening angle $\theta_R$ can be used to allow entry and egress to passenger compartment 316.

For example, an occupant opening front side door 314F within a relatively crowded environment such as a parking garage, might prefer an automatically assisted or powered actuation of front side door 314F through an opening angle less than the entire available range of motion of front side door 314F, i.e. stopping the motion of side door 314F at a variable opening angle $\theta_R$ that is less than the maximum available opening angle $\theta_{max}$.

Because a side-swinging door like front side door 314F may encounter various obstacles 311 within the range of motion, sweep, or path of front side door 314F when front side door 314F is opening or closing, vehicle 310 is preferably further configured with one or more obstacle detection sensors 360, also labeled in FIG. 3 as "S". Sensors 360 are configured for automatically surveying and assessing the immediately surrounding environment of vehicle 310 prior to and/or during the opening and/or closing front side door 314F, as represented in FIG. 3 by arrow 318. Using contact and/or object proximity sensing capabilities, impending and/or actual contact between front side door 314F and an obstacle 311 positioned external to vehicle 310 within the range of motion of front side door 314F, such as a car, post, object, or person, may be avoided or minimized, with obstacles 311 being sensed in both the opening and closing direction of front side door 314F. To provide a warning or alert to an occupant of vehicle 310, an indicator device 337 is preferably positioned within passenger compartment 316 to provide a visible and/or audible alarm or indication when one or more side doors 314F, 314R is about to or actually does make contact an obstacle 311.

Turning to FIG. 4, a controller 335 can control the operation or actuation of front side door 314F and other doors of vehicle 310 according to one or more embodiments. Obstacle detection sensors 360 are in communication with controller 335. In an embodiment, controller 335 can be in electrical communication with a motor-driven hydraulic pump 440, such as a fixed or a variable displacement pump, which is operable for drawing and pressurizing a sufficient supply of hydraulic fluid 442 from a reservoir or sump 445 in response to a signal or command from controller 335. A hydraulic filter 438 may optionally be disposed between pump 440 and actuator 330, and a return flow path is provided from actuator 330 to sump 445 as shown. Hydraulic filter 438 preferably includes pleated particulate removal media sufficient for removing solid contaminants from the hydraulic fluid 442 at a level sufficient to protect actuator 330 within its particular design tolerances, while providing relatively low-pressure drop across filter 438. In another embodiment, controller 335 can be in electrical communication with an electric motor system in order to control the operation or actuation of front side door 314F and other doors of vehicle 310.

Turning to FIG. 5, obstacle detection sensors 360 are shown according to one or more embodiments. Contact-type obstacle sensors 570 preferably include a door angle sensor 571, a current sensor 572, and/or a hydraulic fuse 573, with sensors 571, 572, and 573 being "primary obstacle detection sensors", and a "secondary obstacle detection sensor" being at least one anti-pinch sensor 574, with each of the contact-type sensors 570 being configured to provide information about contact between front side door 314F and an obstacle 311.

Instantaneous door angle sensor 571 can be configured to provide information to controller 335 about the precise instantaneous position or location of side door 314F, i.e. the position of side door 314F at any given moment, and by determining the change in instantaneous position over time, is thereby also operable for determining a threshold change in velocity of side door 314F, as would be likely to occur upon contact with an obstacle 311.

Current sensor 572 is configured to monitor a change in electrical current drawn by pump 440, such as might be taken or measured within controller 335 or another suitable location. For example, in the event of contact between side door 314F and an obstacle 311, the detected velocity of side door 314F may be reduced to a value of approximately zero. Then, as actuator 430 attempts to move side door 314F against obstacle 311, pump 440 would in turn draw more current, which may then be detected or measured by current sensor 572. The detected or measured current can be compared to a stored threshold current. If the detected or measured current surpasses the stored threshold current, contact with an obstacle 311 is likely.

Hydraulic fuse 573 preferably includes a fluid bypass valve portion 556 suitable for reducing fluid pressure across hydraulic fuse 573 by diverting hydraulic fluid 442 as needed in order to prevent further movement of front side door 314F in a direction toward obstacle 311. Such a diversion may be detected or measured as needed to determine the presence of an obstacle 311 in the path of front side door 314F.

Finally, anti-pinch sensor 574 can be a fiber-optic anti-pinch sensor, an electro-resistive, pneumatic, and/or another suitable anti-pinch strip or other anti-pinch device (e.g., a force-feedback actuator) that is configured to detect contact between front side door 314F and obstacle 311. Detection of such contact typically occurs upon the opening or closing of front side door 314F. Anti-pinch sensor 574 is configured to provide a measurable or detectable output signal which varies in a known manner in response to a force or pressure exerted on anti-pinch sensor 574, such as would be exerted when front side door 314F encounters an obstacle 311 when opening or closing.

In addition, one or more non-contact-type obstacle sensors 580 are also provided in order to detect the presence of obstacle 311 without requiring physical contact between front side door 314F and obstacle 311. Using non-contact-type obstacle sensors 580, an obstacle 311 may be recognized and reacted to before front side door 314F contacts obstacle 311. Various sensors may be used in accordance with the embodiment, such as radar-based sensors 581 that can be configured or adapted for detecting an obstacle 311 without physical contact between obstacle and front side door 314F. Non-contact-type sensors 580 (e.g., radar-based sensors 581 and an optical/camera sensor 582) are preferably active in both the opening and closing directions of side door 314F, and operable for detecting obstacles 311 positioned within the range of motion thereof.

Non-contact-type sensors 580 preferably have a sufficiently wide field of view to survey the surrounding area of vehicle 310 and detect, for example, garage doors, vehicles, light posts, pedestrians, trailers, sporting equipment, bicycles, mowers, pillars, poles and the like. Using input from sensors 580, front side door 314F may be permitted to open to within a minimum predetermined clearance with respect to obstacle 311, and then stop once that clearance has been reached.

Using the radar-based sensors 581 to detect an obstacle can be problematic because it is difficult to electronically distinguish between a situation where a radar beam is reflected by an actual obstacle (e.g., a parking pillar, another vehicle, a person, etc.) or an imaginary/false obstacle or object. The imaginary/false obstacle can be caused by an internal reflection of emissions from the radar-based sensors 581 within the vehicle, i.e., vehicle environment noise. The internal reflection can be a reflection off one or more components of the vehicle. False obstacles can cause a door opening procedure to prematurely limit the variable opening angle $\theta_R$ of a vehicle door associated with the vehicle 310.

The internal reflection of emissions from the radar-based sensors 581 creates Multipath signals. Multipath signals are signals that the radar-based sensors 581 receive through two or more paths. The Multipath signals can originate from either a radar main lobe or a radar side lobes. Accordingly, to accurately detect obstacles when conducting a door opening procedure, multipath signal/false obstacle mitigation is needed.

Figure 6:
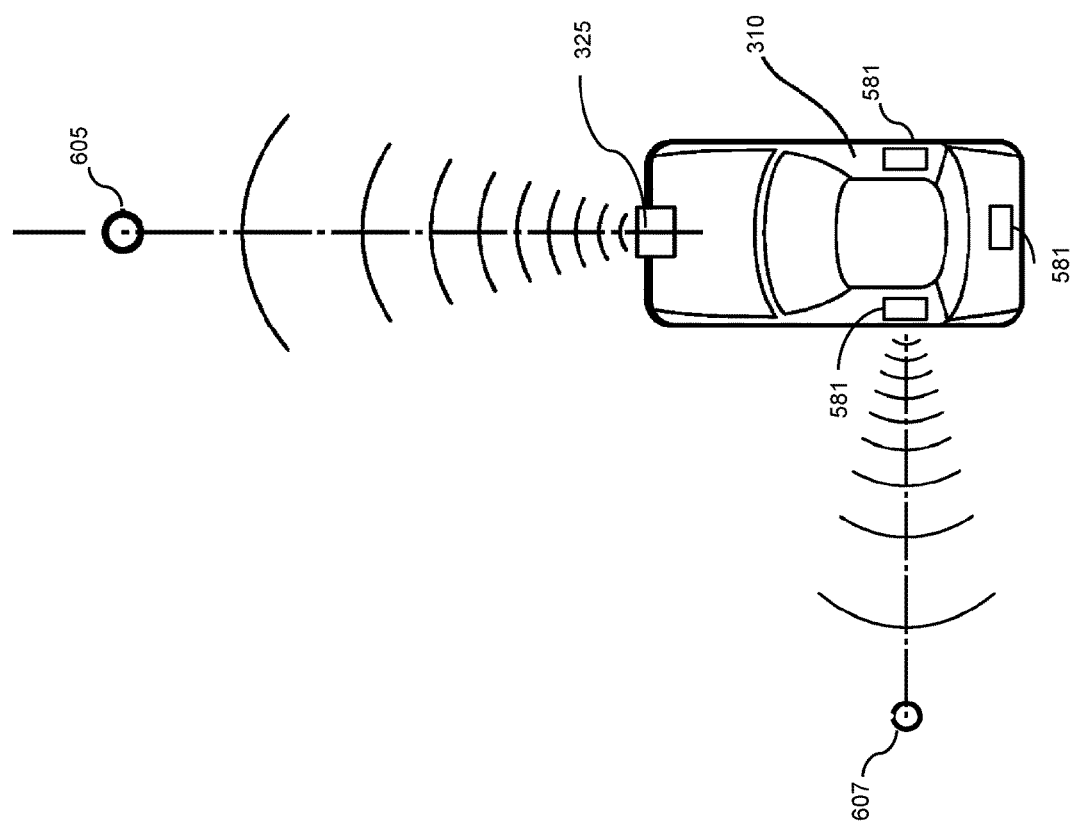
FIG. 6 depicts a vehicle learning mode to detect and mitigate false objects according to one or more embodiments.

FIG. 6 depicts a vehicle-learning mode to detect and mitigate false objects according to one or more embodiments. While the vehicle 310 is under normal operation, data generated by the radar system 325 of vehicle 310 and radar-based sensors 581 can be used to train the obstacle detection sensors 360 (FIG. 3) to identify false objects, i.e., vehicle environment noise.

Vehicle 310 can collect information regarding a target object such as relative range from the vehicle 310 when the vehicle is traveling at a speed above a predetermined threshold, for example, 50 miles per hour. Using the radar system 325 and radar-based sensors 581, vehicle 310 can estimate of relative location, speed and trajectory of an object 605 and an object 607 relative to the vehicle 310 based on a Doppler frequency shift associated with radar signals reflected from the object. Doppler frequency shifts from the radar-based sensors 581 can also be used estimate a relative location, speed and trajectory of the object 605 or the object 607 within a predetermined radius of the vehicle 310.

Because the vehicle 310 is in motion over time, if the radar-based sensors 581 determine that an object has zero relative velocity to the vehicle 310 and/or zero Doppler, the object is deemed vehicle environment noise. Upon a determination that vehicle environment noise exists, the radar-based sensors 581 can filter out the vehicle environment noise. Accordingly, false objects created due to vehicle environment noise can be detected while the vehicle 310 is moving, which can be applied to a door opening procedure by the vehicle 310 to more accurately determine a variable opening angle $\theta_{max}$ because the vehicle 310 can ignore false objects generated due to reflections of radar signals within the vehicle 310. Accordingly, vehicle 310 can learn to distinguish real objects from vehicle environment noise without requiring special calibration of radar-based sensors 581.

The vehicle 310 can automatically enter the vehicle-learning mode periodically (e.g., after an ignition cycle, after a change made to the packaging environment (i.e., mirror adjustment). The periodic vehicle-learning mode can be used to further refine object/obstacle detection, which can used to continually improve the door opening procedure. Accordingly, vehicle 310 can refine its filter over time through cumulative vehicle learning modes.

Figure 7:
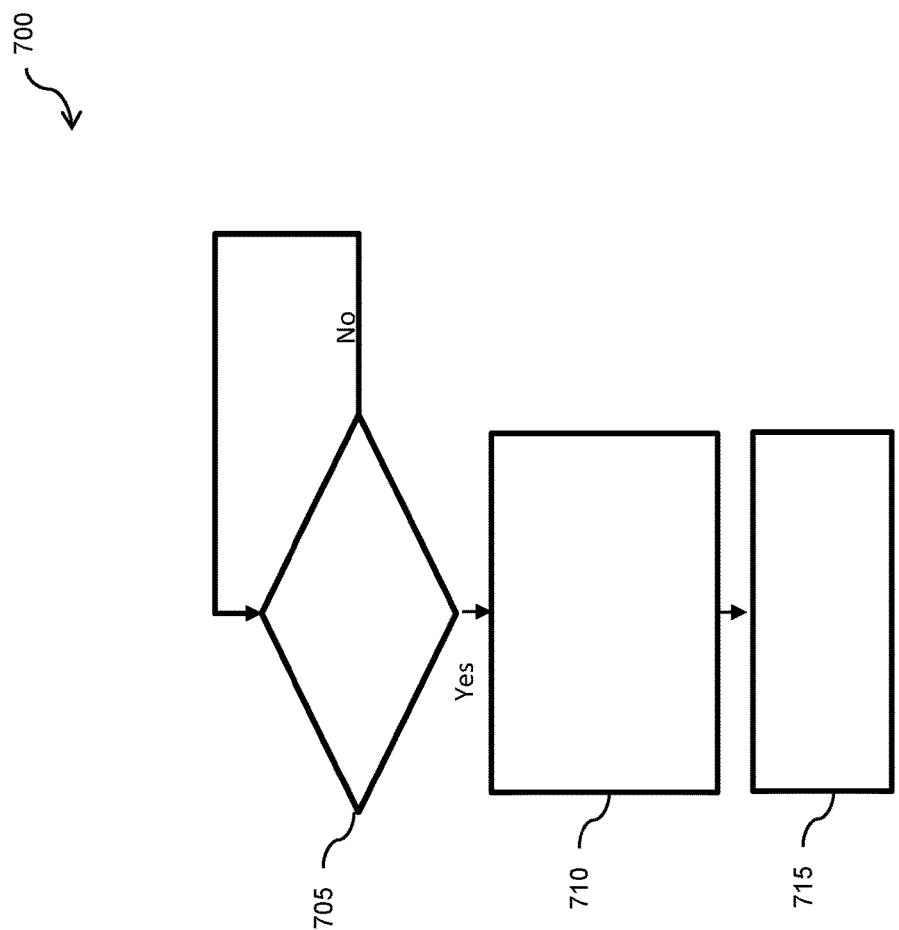
FIG. 7 depicts a flow diagram of a method for learning and characterizing vehicle environment noise for a vehicle according to one or more embodiments.

FIG. 7 depicts a flow diagram of a method 700 for learning and characterizing vehicle environment noise for a vehicle according to one or more embodiments. At block 705, a system, (e.g., system 300), can receive data from a vehicle (e.g., vehicle 310) and determine whether conditions for entering a vehicle learning mode has been met. For example, the system 300 can determine that the vehicle 310 is traveling at a speed above a predetermined threshold (e.g., 50 miles per hour) and/or a time period (15 minutes, 30 minutes, 1 hour, etc.) since the vehicle 310 was last in a vehicle learning mode has exceeded a predetermined threshold. If the conditions for entering a vehicle-learning mode have not been met, the system can continue to monitor the conditions of the vehicle by returning to block 705.

If the conditions for entering a vehicle learning mode has been met, the method 700 proceeds to block 710 where the system can analyze data received from one or more radar systems and/or sensors associated with the vehicle to identify vehicle environment noise, (i.e., objects that have a zero Doppler response and a zero relative velocity over time as related to the vehicle while moving.) At block 715, the system can refine the one or more radar systems and/or sensors based on the identified vehicle environment noise.

Figure 8:
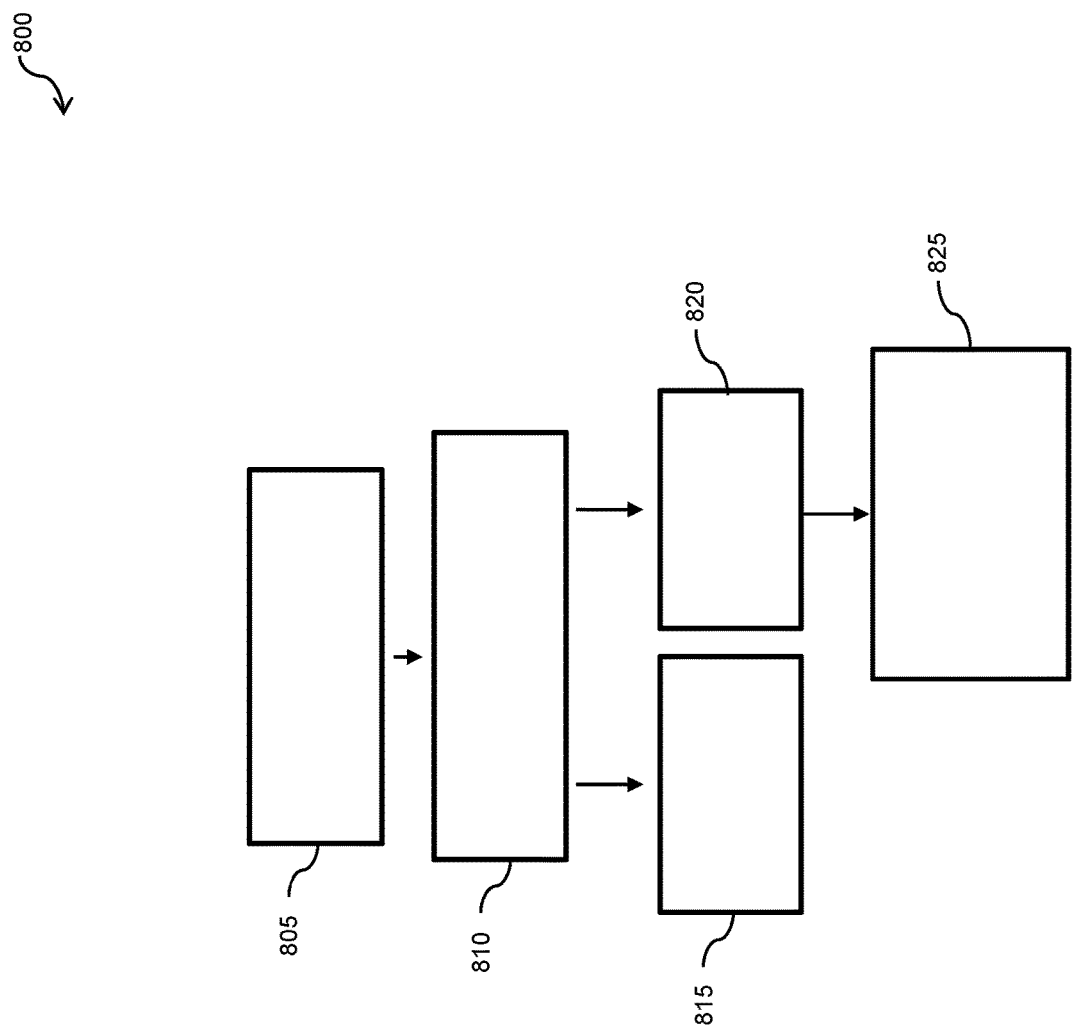
FIG. 8 depicts a flow diagram of a method of operating one or more doors of a vehicle according to one or more embodiments.

FIG. 8 depicts a flow diagram of a method 800 of operating one or more doors of a vehicle according to one or more embodiments. At block 805, a system, (e.g., system 300), can use one or more radar systems and/or sensors to identify stationary objects (object data), for example, when opening one or more doors of the vehicle. At block 810, the one or more radar systems and/or sensors can extract vehicle environment noise generated when identifying stationary objects. At block 815, the system can cause each of the one or more radar systems and/or sensors to mitigate the identified vehicle environment noise (see block 710) by filtering the vehicle environment noise from the object data associated with the identified stationary objects.

At block 820, the system can identify a true external environment using the filtered object data. At block 825, the system can operate one or more doors of the vehicle based on the true external environment.

Accordingly, the embodiments disclosed herein describe a system that can characterize an internal reflection noise of stationary objects (false objects) associated with a radar by identifying objects with zero Doppler and/or zero relative velocity during a self-learning period when the vehicle is at speed. The objects with zero Doppler and/or zero relative velocity are then filtered. The filtered object data can be used in door opening procedures for a vehicle. Accordingly, the system can better identify a variable opening angle for one or more doors of a vehicle in light of objects near the vehicle by eliminating false objects generated by internal reflections of the vehicle radar.

Noise caused by reflections from an internal vehicle environment can cause a radar to report false objects that appear outside of the vehicle in a relevant field of view. In applications such as power door opening sensing, the environment of interest is primarily stationary objects and moving objects that could contact a power door, if opened. False objects can be mapped over top of relevant stationary objects in the same field of view. Thus, the system can separate the relevant stationary objects from the false objects.

Technical effects and benefits of the disclosed embodiments include, but are not limited to improving radar performance in non-dynamic environments that can be used in power door opening applications. In addition, additional trainings could be used to refine vehicle environment noise filtering. Additional trainings could be triggered every ignition cycle, after a change made to the packaging environment (i.e. mirror adjustment), etc.

The present disclosure may be a system, a method, and/or a computer readable storage medium. The computer readable storage medium may include computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other devices to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for operating one or more doors of a vehicle, the method comprising:
   receiving, by at least one radar sensor on the vehicle, input data related to one or more objects;
   filtering, by the at least one radar sensor, vehicle environment noise from the received input;
   identifying, by the at least one radar sensor, an external environment for the vehicle based on the filtered input; and
   operating, by a processor, one or more doors of the vehicle based on the external environment for the vehicle.

2. The method of claim 1, wherein the vehicle environment noise is determined while the vehicle is traveling at a speed above a predetermined threshold.

3. The method of claim 2, wherein vehicle environment noise is determined based on an identification of an object of the one or more objects having a zero Doppler.

4. The method of claim 2, wherein the determination of the vehicle environment noise occurs periodically.

5. The method of claim 1 further comprising calculating a variable opening angle for the one or more doors based on the external environment for the vehicle.

6. The method of claim 1, wherein an object of the one or more objects associated with the vehicle environment noise is designated as a false object.

7. The method of claim 1 further comprising opening the one or more doors of the vehicle to a variable opening angle in response to identifying an object of the one or more objects within the external environment.

8. A system for operating one or more doors of a vehicle, the system comprising:
    a vehicle; wherein the vehicle comprises:
        one or more doors;
        a memory and a processor coupled to the memory; and
        one or more radar sensors;
    wherein the one or more radar sensors are operable to:
        receive input data related to one or more objects;
        filter vehicle environment noise from the received input; and
        identify an external environment for the vehicle based on the filtered input; and
    wherein the processor is operable to:
        operate the one or more doors based on the external environment for the vehicle.

9. The system of claim 8, wherein the vehicle environment noise is determined while the vehicle is traveling at a speed above a predetermined threshold.

10. The system of claim 9, wherein vehicle environment noise is determined based on an identification of an object of the one or more objects having a zero Doppler.

11. The system of claim 9, wherein the determination of the vehicle environment noise occurs periodically.

12. The system of claim 8, wherein the processor is further operable to calculate a variable opening angle for the one or more doors based on the external environment for the vehicle.

13. The system of claim 8, wherein an object of the one or more objects associated with the vehicle environment noise is designated as a false object.

14. The system of claim 8, wherein the processor is further operable to open the one or more doors to a variable opening angle in response to identifying an object of the one or more objects within the external environment.

15. A non-transitory computer readable medium having program instructions embodied therewith, the program instructions readable by a processor to cause the processor to perform a method for operating one or more doors of a vehicle, the method comprising:
    receiving input data related to one or more objects;
    filtering vehicle environment noise from the received input;
    identifying an external environment for the vehicle based on the filtered input; and
    operating one or more doors of the vehicle based on the external environment for the vehicle.

16. The computer readable storage medium of claim 15, wherein the vehicle environment noise is determined while the vehicle is traveling at a speed above a predetermined threshold.

17. The computer readable storage medium of claim 16, wherein vehicle environment noise is determined based on an identification of an object of the one or more objects having a zero Doppler.

18. The computer readable storage medium of claim 16, wherein the determination of the vehicle environment noise occurs periodically.

19. The computer readable storage medium of claim 15 further comprising calculating a variable opening angle for the one or more doors based on the external environment for the vehicle.

20. The computer readable storage medium of claim 15 further comprising opening the one or more doors of the vehicle to a variable opening angle in response to identifying an object of the one or more objects within the external environment.

* * * * *